United States Patent [19]

Yamakawa et al.

[11] Patent Number: 4,954,956
[45] Date of Patent: Sep. 4, 1990

[54] DATA PROCESSING APPARATUS HAVING FUNCTION OF PROVIDING HELPFUL INFORMATION AFTER EXCESSIVE TIME LAPSE FROM LAST INPUT OPERATION

[75] Inventors: Kiyoshi Yamakawa, Gifu; Yoshio Sugiura, Aichi; Satoru Tsuruki, Nagoya, all of Japan

[73] Assignee: Brother Kogyo Kabushiki Kaisha, Aichi, Japan

[21] Appl. No.: 131,405

[22] Filed: Dec. 10, 1987

[30] Foreign Application Priority Data

Dec. 13, 1986 [JP] Japan .................................. 61-297013

[51] Int. Cl.[5] .............................................. G06F 9/00
[52] U.S. Cl. ................................... 364/419; 364/975; 364/943; 364/943.1; 364/943.3; 364/943.5
[58] Field of Search ............... 364/200, 900, 492, 494, 364/419, 468; 340/712, 718

[56] References Cited

U.S. PATENT DOCUMENTS 4,369,493  1/1983  Kronenberg ........................ 364/200

FOREIGN PATENT DOCUMENTS 89468   9/1983  European Pat. Off. ..
97818   1/1984  European Pat. Off. ..
170198  2/1986  European Pat. Off. ..

*Primary Examiner*—Gareth D. Shaw
*Assistant Examiner*—John G. Mills
*Attorney, Agent, or Firm*—Oliff & Berridge

[57] ABSTRACT

A data processing apparatus having an input device for entering data, and a timer connected to the input device for measuring a predetermined time duration during which a data entry operation through the input device is interrupted. The apparatus is provided with a display, buzzer or any visual, audio or optical device for providing information associated with the data entry operation interrupted, when the timer has measured the predetermined time duration. The associated information may be a candidate word or words to be substituted for a word in the process of entry into an electronic typewriter or a word processor. The associated information may also be information such as addresses or telephone numbers of persons or companies whose data have been entered prior to the data input interruption. Further, the associated information may be a message prompting the operator to enter a specific kind of data, or information indicative of an operation that should be performed after the interruption of data entry.

18 Claims, 13 Drawing Sheets

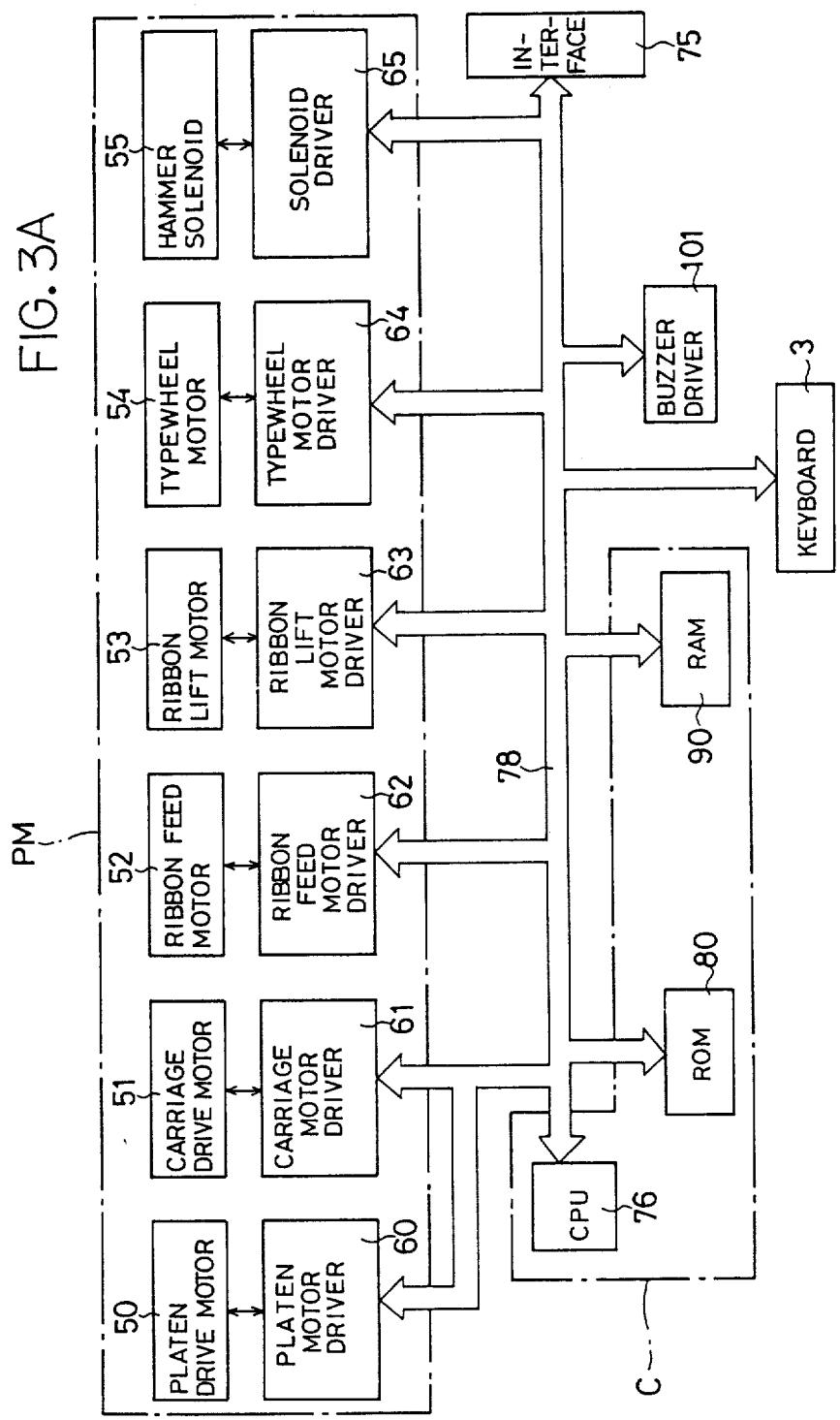

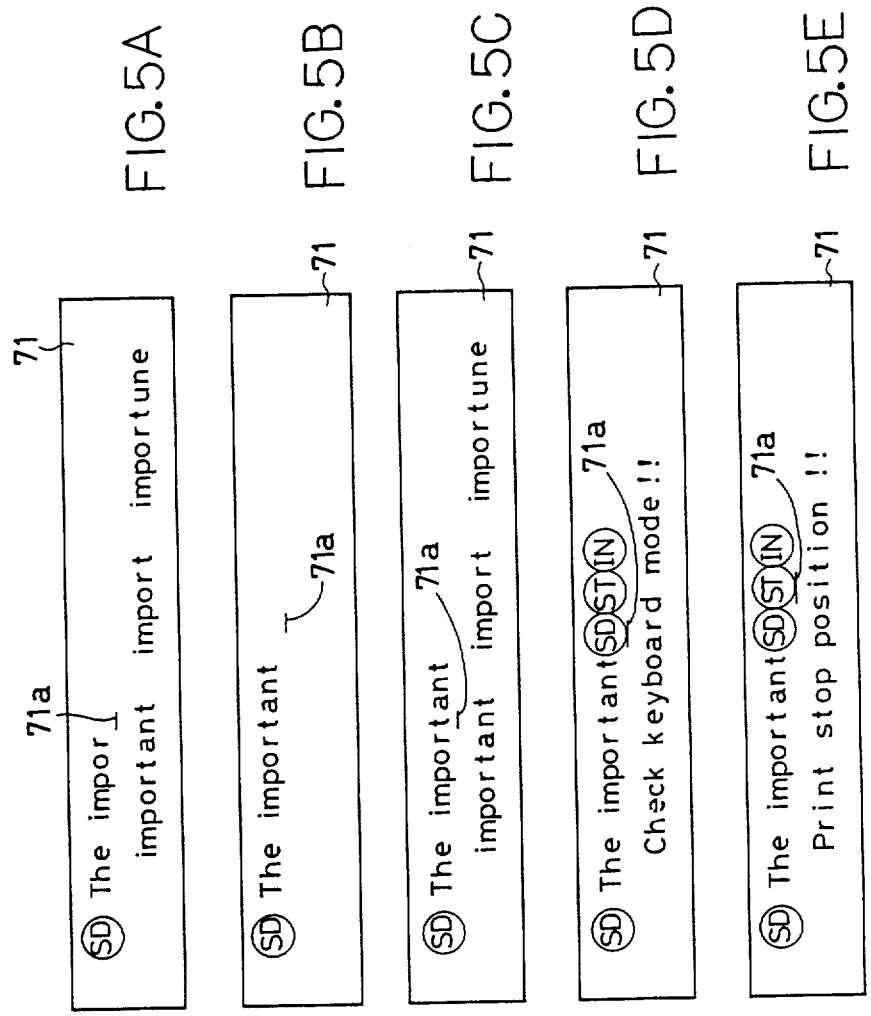

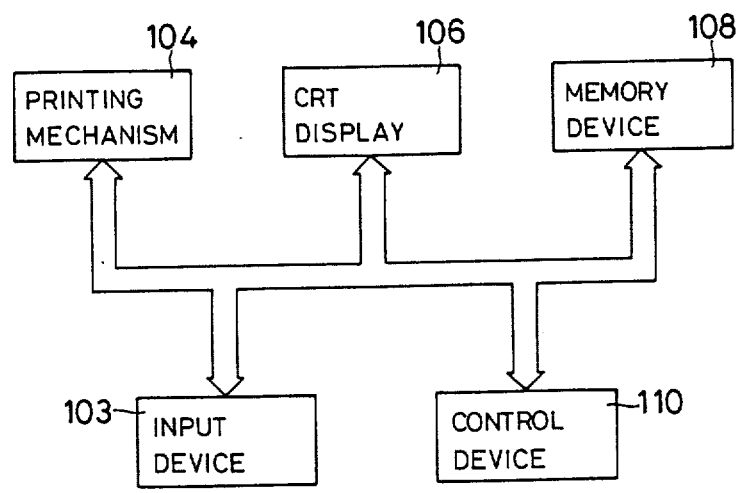
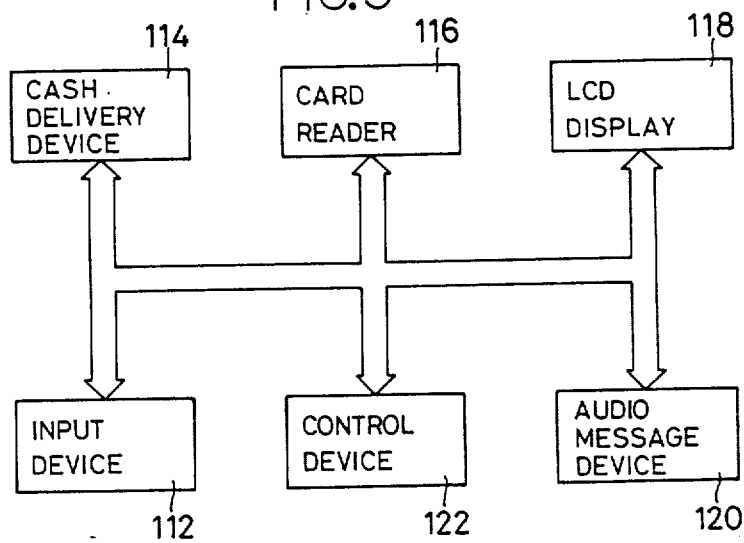

DATA PROCESSING APPARATUS HAVING FUNCTION OF PROVIDING HELPFUL INFORMATION AFTER EXCESSIVE TIME LAPSE FROM LAST INPUT OPERATION

BACKGROUND OF THE INVENTION

1. Field of the Invention

The present invention relates generally to a data processing apparatus, and more particularly to a data processing apparatus which has informing means which is activated, if an interruption of a data input or entry operation continues for more than a predetermined time duration, for automatically providing related information associated with the data input operation interrupted.

2. Discussion of the Prior Art

A computer is known as a data processing apparatus or system having a display device. Such a data processing apparatus generally has a function of assisting the operator in entering programs or commands, when the operator is not familiar with a data entry procedure or does not know a command or data that should be entered next. With this assisting or prompting function activated, the display provides information associated with the entry procedure, or the command or data that should be entered next.

An English-language word processor or electronic typewriter is also considered as another type of data processing apparatus. Such a word processor or typewriter has a spell-checking function of checking entered word data for any misspelled words, or a function of displaying a candidate word or words which relate to an entered word, or a word which is being entered. The latter function is utilized when the operator is not sure of the spelling of the entered word or an already entered portion of the entered word. These functions ate widely used in the field of word processors or electronic typewriters.

To display the candidate words for partially entered words, for example, a specific key must be operated during entry of each word for which the candidate words are desired.

In the computer having the assisting or prompting function described above, a specific key must also be operated in order to activate the function. This leads to reduced operating efficiency, particularly when the operator does not know the position of the specific key.

Similarly, the word processor or electronic typewriter having the candidate-word displaying function suffers from a low operating efficiency when the candidate words are displayed. Namely, the specific key must be operated each time the operator desires to know a candidate word or words for a given word. This increases the number of keying actions on the keyboard.

SUMMARY OF THE INVENTION

It is accordingly an object of the present invention to provide a data processing apparatus which has informing means activated if an interruption of a data input operation continues for more than a preset length of time, for providing information associated with the data input operation interrupted, and thus improving the operating efficiency of the apparatus.

The above object can be achieved according to the principle of the present invention, which provides a data processing apparatus comprising input means for entering data, time-measuring means connected to the input means, for measuring a predetermined time duration during which a data entry operation through the input means is interrupted, and informing means responsive to the time-measuring means, for providing related information associated with the data entry operation interrupted, when the time-measuring means has measured the predetermined time duration.

In the data processing apparatus of the present invention constructed as described above, a time duration for which a data entry operation through the input means is interrupted is measured by the time-measuring means. If the time duration measured by the time-measuring means exceeds a predetermined value, the informing means is activated to provide related information which relates to the data entry operation interrupted.

According to one feature of the invention, the data processing apparatus further comprises a dictionary memory storing word data representative of a multiplicity of words, and the input means includes an input device which is capable of entering a statement or document data including word data representative of a plurality of words each consisting of at least one character, and word-separation data indicative of termination of entry of each of the plurality of words of the statement data. The time-measuring means is adapted to measure an interruption time during which the operation to enter each word is interrupted. In this case, the informing means is operated to scan the dictionary memory to search for at least one candidate word which includes as many characters as possible which have been entered before interruption of the operation to enter the each word, the informing means including a display for displaying the at least one candidate word as the related information, and a control device for controlling the display.

In one form of the above feature of the invention, the time-measuring means determines whether data which has been entered last consists of character data representative of a character. The time-measuring means starts to measure the interruption time upon determination that the data which has been entered last consists of character data.

According to another feature of the invention, the informing means comprises a display for displaying the data entered through the input means, and a dictionary memory storing word data representative of a multiplicity of words, the display having a cursor. The input means has means for moving the cursor, and the time-measuring means measures the predetermined time duration while the cursor is positioned at one of characters of a word displayed on the display to designate the word. The informing means is adapted to scan the dictionary memory to search for at least one related word which relates to the word designated by the cursor. The display displays the related word or words as the related information. For example, the above-indicated at least one related word consists of at least one candidate word to be substituted for the word designated by the cursor.

According to a further feature of the invention, the input means includes operator-controlled means for activating the informing means before the time-measuring means has measured the predetermined time duration.

According to a still further feature of the invention, the input means includes a keyboard which has a plurality of keys and which is operable selectively in a plurality of modes in which at least one of the keys generates different data signals, respectively. The keyboard includes an operator-controlled selector for selecting one of the plurality of modes. The informing means is activated upon operation of the selector, to provide as the related information a message to prompt the operator to confirm the adequacy of the mode selected by the selector.

In accordance with a still further feature of the invention, the informing means comprises a display having a cursor movable thereon, and the input means comprises a keyboard which has a plurality of character keys and which is operable selectively in a plurality of modes in which the character keys generate different data signals, respectively. The keyboard includes an operator-controlled selector for selecting one of the plurality of modes, and cursor-positioning means for moving the cursor on the display. The display displays a character indicative of an operation of the selector. In this case, the informing means is activated to provide as the relation information a message to prompt the operator to confirm the adequacy of the mode selected by the selector, if the cursor is positioned at the character indicative of the operation of the selector.

According to a yet further feature of the invention, the apparatus further comprises a printing device for printing data entered through the input means, and stop command means for providing a stop command to stop the printing device. In this case, the informing means is activated in response to the stop command, to provide as the related information a message informing the operator that a printing operation of the printing device is stopped.

In accordance with another feature of the invention, the apparatus further comprises a printing device and stop command means for providing a stop command to stop the printing device, and the informing device comprises a display having a cursor movable thereon. The input means comprises cursor-positioning means for moving the cursor on the display. The display displays a character indicative of the stop command. In this instance, the informing means is activated, if the cursor is positioned at the character indicative of the stop command, to provide as the related information a message informing the operator that a printing operation of the printing device is stopped.

According to still another feature of the invention, the apparatus further comprises a dictionary memory storing word data representative of a multiplicity of words, and the input means includes a keyboard which is capable of entering a statement or document data including word data representative of a plurality of words each consisting of at least one character, and word-separation data indicative of termination of entry of each of the plurality of words. The time-measuring means consists of means for measuring an interruption time during which the operation to enter the each word is interrupted. In this case, the informing means is operable to scan the dictionary memory to determine whether the dictionary memory stores a word which includes successive characters which have been entered before interruption of the operation to enter the each word. The informing means includes an alarm device which is activated upon determination that the dictionary memory does not store the word which includes the successive characters. The alarm device provides as the related information an audible alarm informing the operator that the successive characters are misspelled.

In accordance with yet another feature of the invention, the time-measuring means comprises means for measuring an interruption time during which a data entry operation is interrupted after an operation to enter a specific kind of data is interrupted. In this instance, the informing means comprises means for providing as the related information information which is associated with an operation that should be executed after interruption of the data entry operation.

In one form of the above feature of the invention, the informing means comprises a display for displaying the information, and a control device for controlling the display. In an alternative form of the same feature of the invention, the informing means comprises an audio message device for providing the information in an audible manner, and a control device for controlling the audio message device. According to another alternative form of the sam feature of the invention, the input means comprises an input device capable of entering as the specific data proper names such as names of persons and companies, and the informing means comprises an output device for providing information such as addresses and telephone numbers which correspond to the proper names. According to a further alternative form, the input means comprises an input device capable of entering a command as the specific data, and the informing means comprises an output device for providing information indicating the operator of an operation that should be performed next.

BRIEF DESCRIPTION OF THE DRAWINGS

The above and optional objects, features and advantages of the present invention will become more apparent by reading the following detailed description of presently preferred embodiments, when considered in connection with the accompanying drawings, in which:

FIGS. 3A, 3B and 3C are schematic block diagrams showing a control system of the typewriter;

FIG. 5A through 5E are illustrations showing different states of a display of the typewriter, indicating examples of the candidate words, and messages associated with an operation to enter or edit word data through keys, when the operation is interrupted for more than a predetermined time duration;

FIG. 7 is a block diagram showing a word processor according to a further embodiment of the invention;

FIG. 9 is a block diagram showing a casher delivery apparatus according to a still further embodiment of the invention.

DETAILED DESCRIPTION OF THE PREFERRED EMBODIMENTS

The electronic typewriter as a data processing apparatus according to one embodiment of the present invention is shown in FIGS. 1, 2 and FIGS. 3A-3C. As described below in detail, this typewriter is capable of automatically displaying candidate word or words to be substituted for displayed word data, which is designated by a cursor, when an operation on a keyboard to enter or edit the word data is interrupted for more than a preset time.

Figure 1:
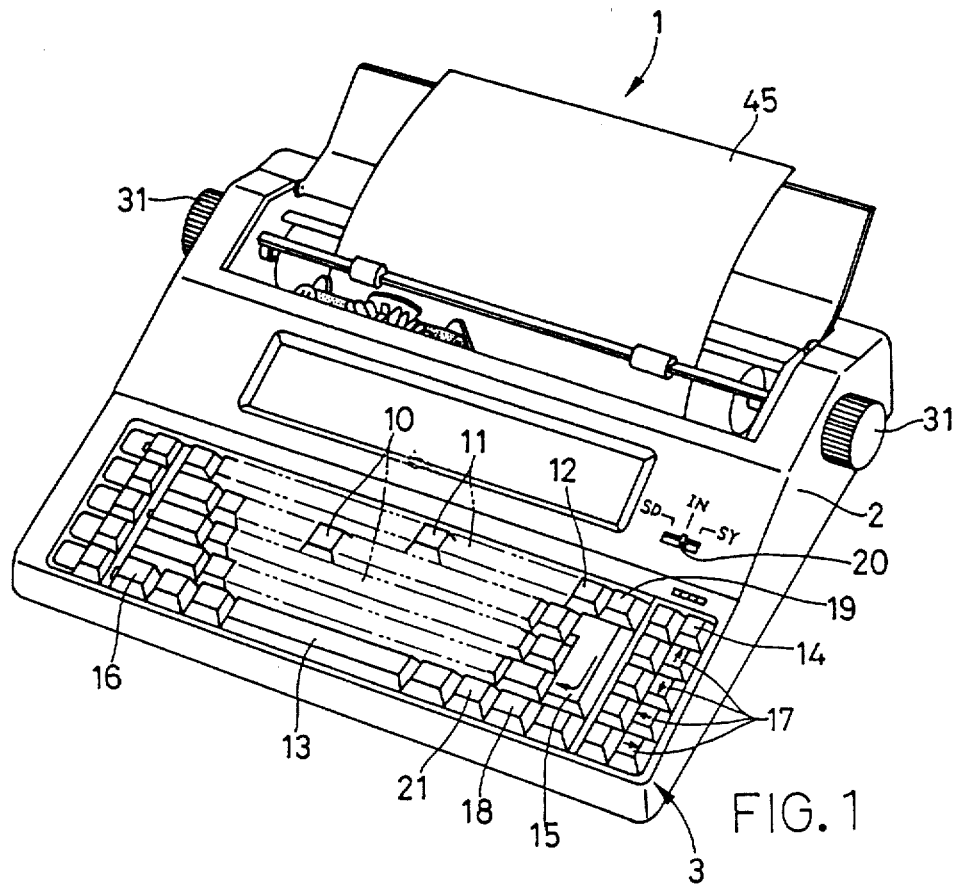
FIG. 1 is a perspective view of one embodiment of a data processing apparatus of the invention in the form of an electronic typewriter.

Referring first to FIG. 1, the typewriter is generally indicated at 1. The typewriter 1 has a main frame 2 whose front portion accommodates the above-indicated keyboard 3, and whose rear portion accommodates a printing mechanism PM.

The keyboard 3 has various keys which include: character keys consisting of alphabet keys 10, numeral keys 11 and symbol keys 12; a space key 13; a backspace key 14; a RETURN key 15; a CODE key 16; CURSOR keys 17 for moving a cursor 71a on a liquid crystal display (LCD display) 71, to indicate a position at which data is entered; a SPELL key 18 for displaying the candidate words; a STOP key 19 for generating a STOP code to stop a printing operation of the printing mechanism PM; a KEYBOARD-MODE selector switch 20 of a sliding type for selecting one of three keyboard modes, i.e., STANDARD mode (SD), INTERNATIONAL mode (IN) and SYMBOL mode (SY); and a NEXT-CANDIDATE key 21 for changing the currently displayed candidate word to the next candidate word, if any. By changing the keyboard mode from one to another, the data signals generated by the character keys 10-12 are accordingly changed.

Since the functions of the various function keys indicated above are well known in the art or similar to those of an existing ordinary typewriter, no further description of the function keys is deemed necessary.

Behind the keyboard 3, there is disposed the LCD display (liquid crystal display) 71 adapted to display statement data which includes word data representative of words, and word-separation data indicative of termination of entry of each word. The word data consists of character data representative of characters entered through the character keys 10-12, and the word-separation data includes space data entered through the space key 13, period data entered through one of the symbol keys 12, etc.

The printing mechanism PM includes a platen 30 which is rotated automatically by a platen drive motor 50 (FIG. 3A) or manually by platen knobs 31, to feed a sheet of paper 45.

Figure 2:
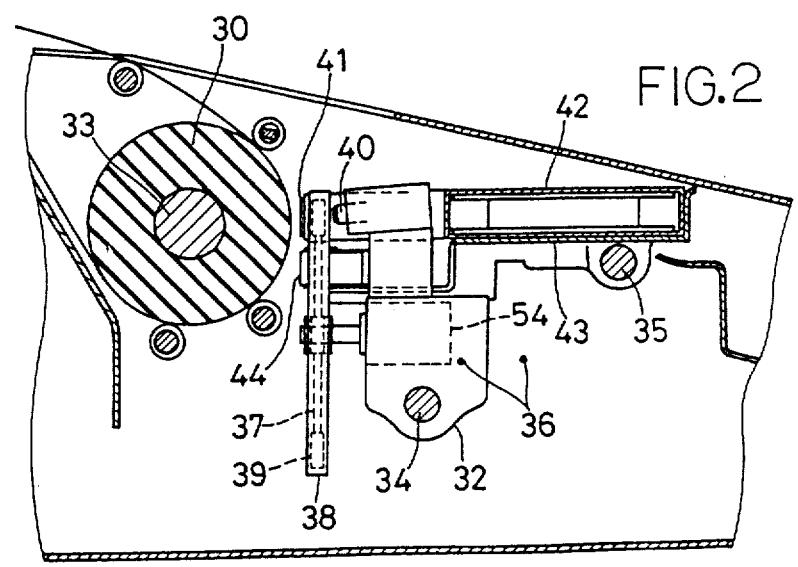
FIG. 2 is a fragmentary side elevational view in transverse cross section of the typewriter of FIG. 1.

As shown in FIG. 2, a carriage 32 is supported by two guide rods 34, 35, so that the carriage 32 is reciprocated in a direction parallel to the platen 30, by a carriage drive motor 51 (FIG. 3A) through a wire 36.

The carriage 32 includes a typewheel motor 54 mounted thereon to drive a typewheel 37 accommodated in a typewheel cassette 38. The motor 54 has an output shaft which is removably coupled to the typewheel 37, so that a selected one of type fonts 39 formed at free ends of radial spokes of the typewheel 37 is brought into a printing position aligned with a print hammer 40, by a rotary indexing motion of the typewheel 37. The print hammer 40 is driven by a hammer solenoid 55 (FIG. 3A) which is energized by a drive current supplied from a solenoid driver 65 (FIG. 3A), so that the type font 39 placed in the printing position is struck by the hammer 40 against the paper 45.

A ribbon cassette 42 accommodating a print ribbon 41 is supported on a holder 43 which is mounted on the carriage 32 such that the holder 43 is pivotally moved about its front end. The print ribbon 41 is fed by a ribbon feed motor 52 (FIG. 3A). A correction ribbon 44 extends along a rear end of a rear lower portion of the holder 43.

The carriage 32 also has a cam mechanism (not shown) mounted thereon, which mechanism is coupled to a drive shaft (not shown) driven by a ribbon lift motor 53 (FIG. 3A), for pivotally moving the holder 43 to a selected one of three positions. That is, the holder 43 has: a printing position (as shown in FIG. 2) in which the print ribbon 41 is positioned between the selected type font 39 and the platen 30; a rest position (not shown) in which the print ribbon 41 is located downwardly away from the printing position; and an erase position in which the correction ribbon is located in the printing position.

A control system of the typewriter 1 described above will be described by reference to the block diagrams of FIGS. 3A, 3B and 3C.

As shown in FIG. 3A, the printing mechanism PM includes the platen drive motor 50, a driver 60 to control the motor 50, the carriage drive motor 51, a driver 61 to control the motor 51, the ribbon feed motor 52, a driver 62 to control the motor 52, the ribbon lift motor 53, a driver to control the motor 53, the typewheel drive motor 54, a driver 64 to control the motor 54, the print hammer solenoid 55, and a driver 65 to control the solenoid 55. The drivers 60-65 are connected to a CPU (central processing unit) 76 of a control device C.

Figure 3B:
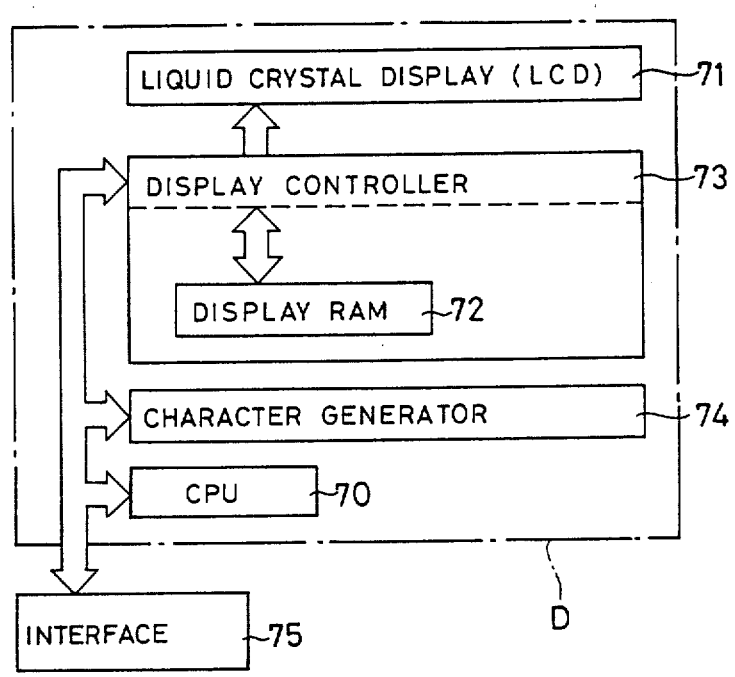

As indicated in FIG. 3B, the typewriter 1 is equipped with a display device D, which includes the LCD display 71 indicated above, a CPU (central processing unit) 70, a display controller 73, and a character generator 74. The LCD display 71 has a 20-digit capacity capable of displaying characters in two lines or rows. The display controller 73 has a display RAM 72 which stores display data corresponding to the individual digit positions on the LCD display 71. The display generator 74 stores a batch of dot-matrix pattern data corresponding to coded characters data representative of about 400 characters such as letters and symbols, which coded character data are generated by the keyboard 3.

Figure 3C:
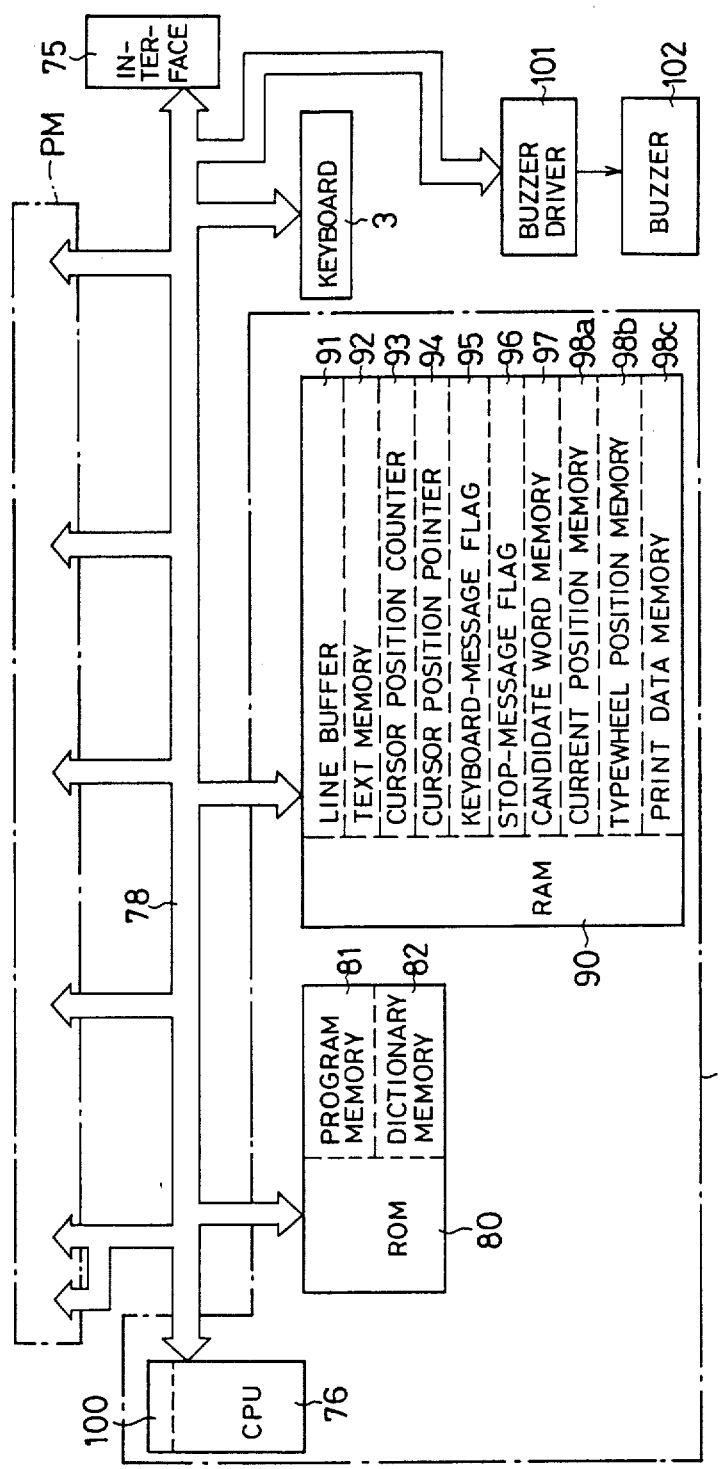
Figure 4A:
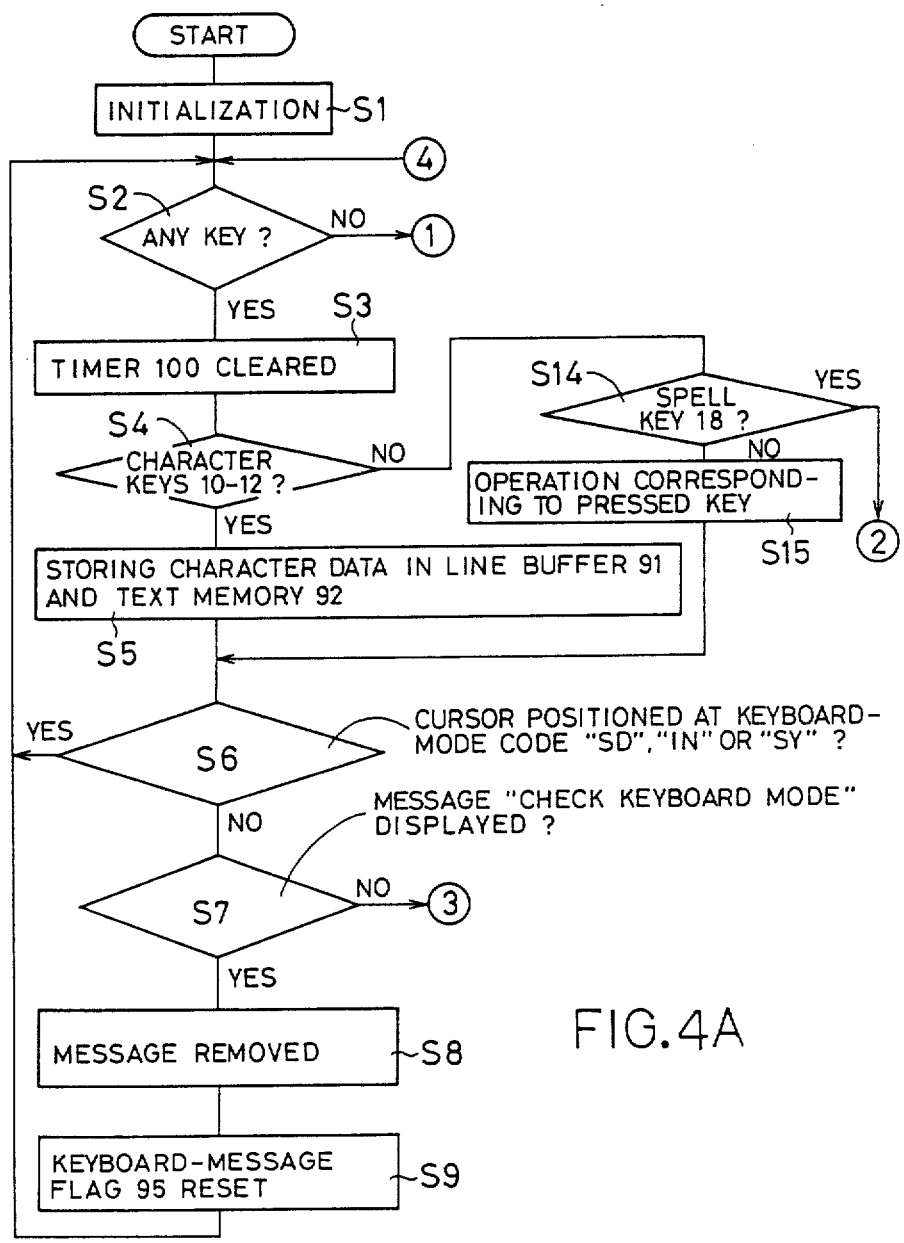
FIGS. 4A, 4B, 4C and 4D are flow charts showing a control routine for displaying candidate words for entered word data.
Figure 4B:
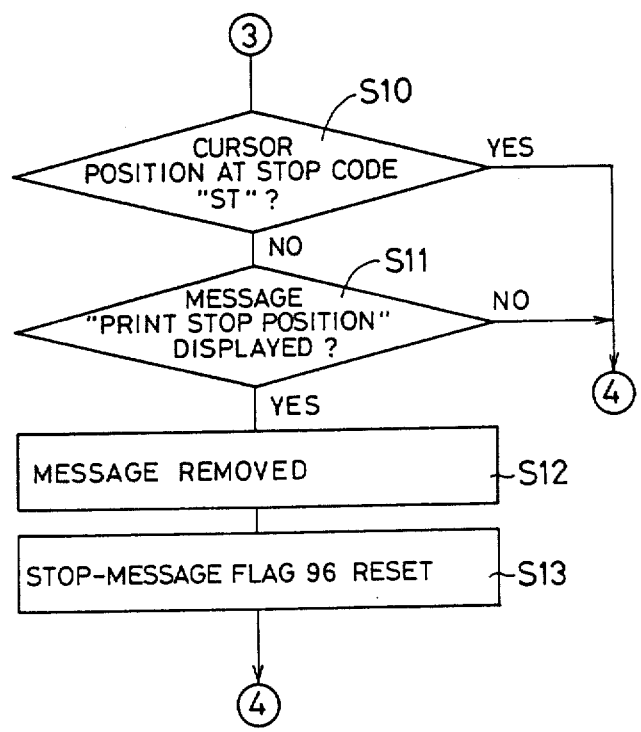
Figure 4C:
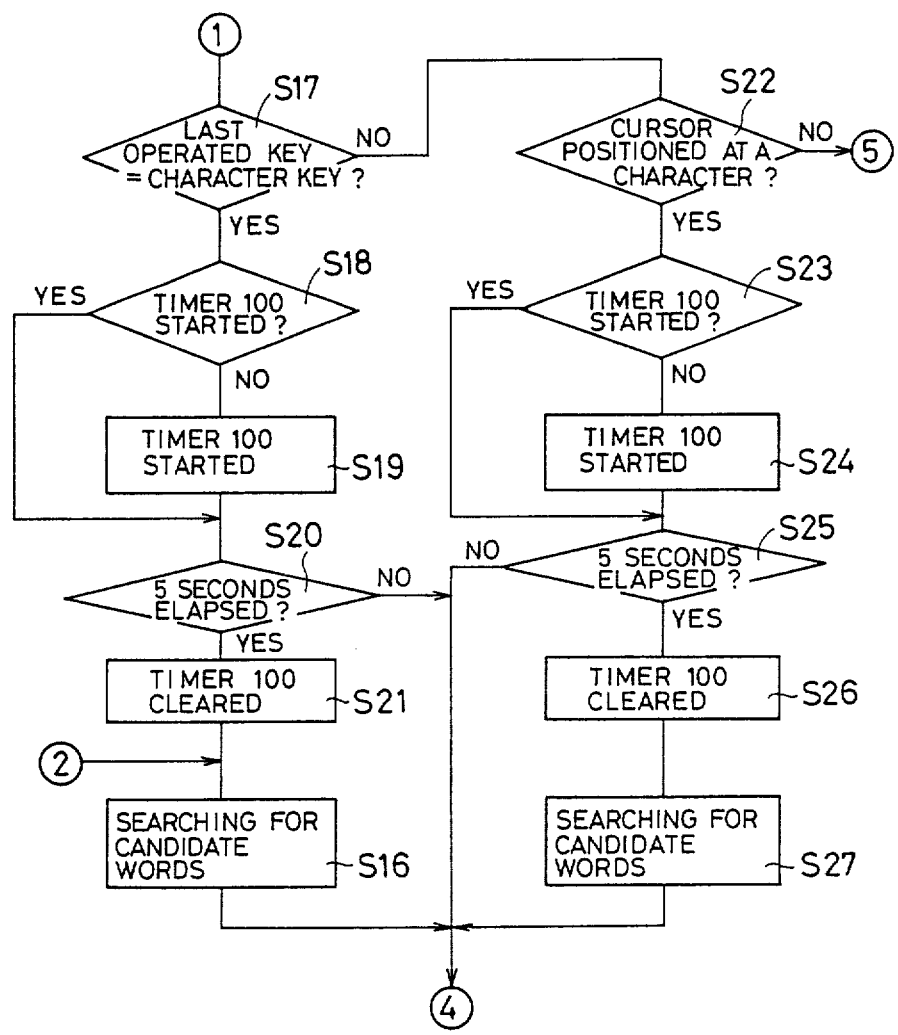
Figure 4D:
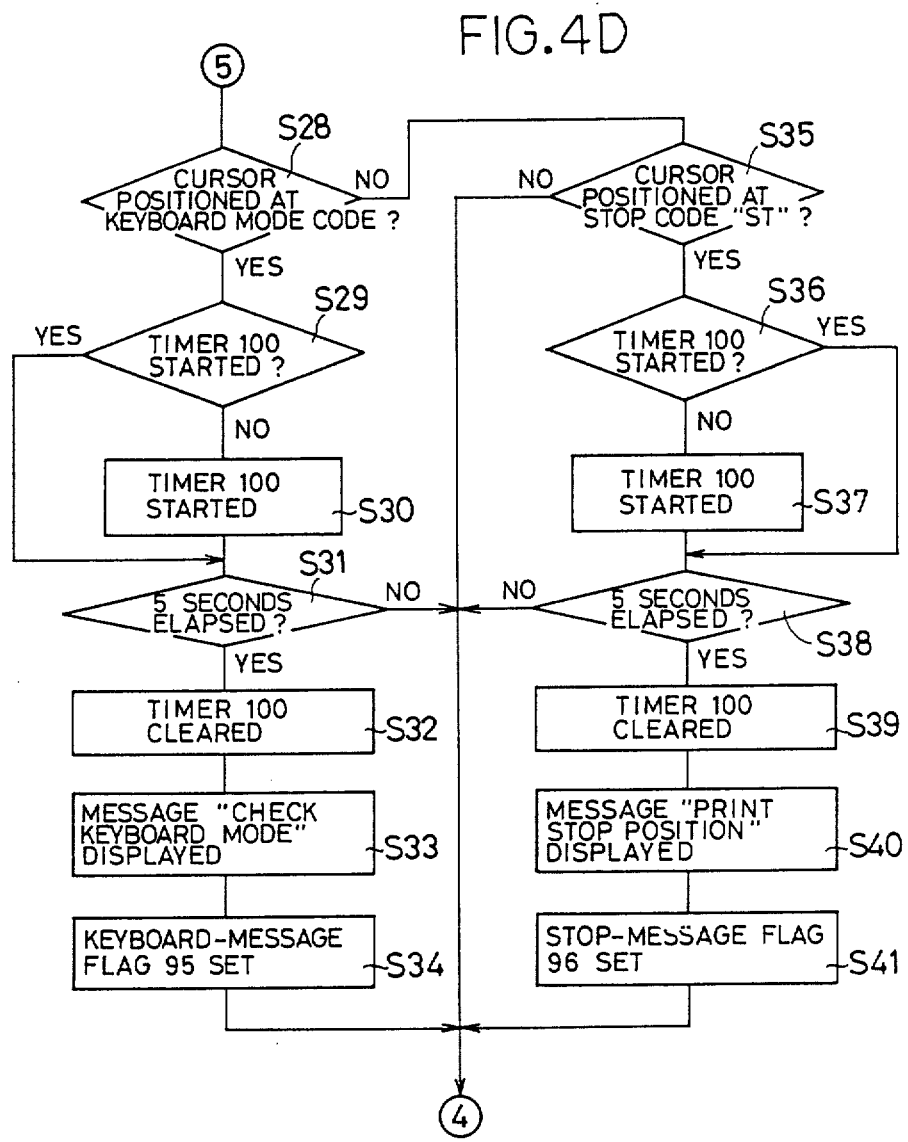

The CPU 70 of the display device D is connected to a CPU (central processing unit) 76 of a control device C as shown in FIG. 3C, through an interface 75, so that the dot-matrix pattern data corresponding to the coded character data or command data from the CPU 76 is retrieved from the character generator 74. The retrieved dot-matrix pattern data is supplied to the display controller 73.

The display controller 73 stores the received dot-matrix pattern data as the display data in the display RAM 72, and applies to the LCD display 71 a display signal corresponding to the display data, i.e., dot-matrix pattern data representative of a character.

The control device C includes the above-indicated CPU 76, and a ROM (read-only memory) 80 and a RAM (random-access memory) 90 which are connected to the CPU 76. To the CPU 76 are connected the keyboard 3, the drivers 60-65, the interface 75, and a buzzer driver 101, through a data bus 78 (FIG. 3A). The buzzer driver 101 controls an alarm buzzer 102 which will be described.

The ROM 80 includes a program memory 81 and a dictionary memory 82. The program memory 81 stores: a control program for controlling the drive motors 50-54, the hammer solenoid 55 and the display device D, in response to the coded character data and function data from the keyboard 3; a control program for scanning the dictionary memory 82 to search for a candidate word or words which include successive characters which have been entered; and control programs (which will be described) for displaying the searched candidate words, and messages relating to the mode of the keyboard 3 currently selected by the selector switch 20, and the print stop command generated by the STOP key 19.

The dictionary memory 82 of the ROM 80 stores a batch of word data representative of about 70,000 words or entries (including inflected forms), which are arranged in the alphabetical order as in an ordinary dictionary.

The RAM 90 includes a line buffer 91, a TEXT memory 92, a CURSOR POSITION counter 93, a CURSOR POSITION pointer 94, a KEYBOARD-MESSAGE flag 95, a STOP-MESSAGE flag 96, a CANDIDATE WORD memory 97, a CURRENT position memory 98a, a TYPEWHEEL position memory 98b, and a PRINT DATA memory 98c. The line buffer 91 stores a series of word data (statement data) which has been entered through the keyboard 3 in a memory mode (which will be described), or which is displayed on the LCD display 71 based on the word data retrieved from the TEXT memory 92. The line buffer 91 has a capacity corresponding to two lines of characters (capacity of the LCD display 71). The TEXT memory 92 stores text data representative of a text or texts entered through the keyboard 3. The CURSOR POSITION counter 93 adapted to detect the current position of the cursor on the LCD display 71, by counting the number of characters entered through the keyboard 3, or the number of operations of the CURSOR keys 17. The count of the counter 93 is changed from 0 to 20 when the cursor is positioned in the first line of the display 71, and from 100 to 120 when the cursor is positioned in the second line. The CURSOR POSITION pointer 94 designates the address of the line buffer 91, which corresponds to the current position of the cursor represented by the current count of the counter 93. The KEYBOARD-MESSAGE flag 95 stores data indicating whether a message "Check keyboard mode" (which will be described) is displayed or not. The STOP-MESSAGE flag 96 stores data indicating whether a message "Print stop position" (which will be described) is displayed or not. The CANDIDATE WORD memory 97 stores word data representative of at least one candidate word, which has been retrieved from the dictionary memory 82. The CURRENT POSITION memory 98a stores data indicative of a current position of the carriage 32, and the TYPEWHEEL POSITION memory 98b stores data indicative of a current angular position of the typewheel 37, i.e., the identification number of the type font 39 which is currently placed in the printing position. The PRINT DATA memory 98c stores coded character data (statement data or text data consisting of a batch of word data) as the individual characters are successively printed. The RAM 90 includes various other memories for temporarily storing data obtained as a result of arithmetic operations by the CPU 76.

The typewriter 1 is operable in a typewriter mode or a memory mode. In the typewriter mode, characters entered through the keyboard 3 are printed on the paper 45 by the printing mechanism PM, according to the corresponding coded character data and space data generated by the character keys 10-12 and space key 13, and the appropriate control program stored in the program memory 81. These coded character data are stored in the PRINT DATA memory 98c such that the stored character data correspond to the printing positions. Further, the CPU 76 updates the data in the CURRENT POSITION memory 98a and TYPEWHEEL POSITION memory 98b, as the carriage drive motor 51 and the typewheel drive motor 54 are operated. The coded command data corresponding to the various function keys to control the various drive motors 50-55 of the printing mechanism PM are processed by the CPU 76, according to the appropriate control program in the program memory 81, so that drive signals are applied to the respective drivers 60-65.

When the typewriter 1 is placed in the memory mode, the CPU 76 stores in the line buffer 91 and the text memory 92 coded character data generated by the keyboard 3. At the same time, the CPU 76 applies the generated coded character data to the CPU 70 of the display device D, through the interface 75, and controls the LCD display 71, so that the corresponding characters are successively displayed, while the cursor is moved accordingly. These operations are also executed according to the control program stored in the program memory 81.

Referring next to the flow charts of FIGS. 4A, 4B, 4C and 4D, there will be described a control routine executed by the control device C of the typewriter 1 in the memory mode, for displaying a candidate word or words for entered character data.

When power is applied to the typewriter 1, the CPU 76 initially executes step S1 to initialize various settings of the typewriter, and then goes to step S2. In step S2, the CPU 76 determines whether any key has been operated. If an affirmative decision is obtained in step S2, the CPU 76 goes to step S3 to clear a timer 100 incorporated therein. Step S3 is followed by step S4.

In step S4, the CPU 76 determines whether any character key 10-12 has been operated. If an affirmative decision is obtained in step S4, the CPU 76 goes to step S5 to store the corresponding coded character data in the line buffer 91 and text memory 92 of the RAM 90. Step S5 is followed by step S6.

In step S6, the CPU 76 determines whether the cursor on the LCD display 71 is positioned at one of three KEYBOARD-MODE codes "SD", "IN" and "SY" which correspond to the three keyboard modes. This determination is effected according to the data in the CURSOR position pointer 94 and the data in the line buffer 91. Step S6 is followed by step S7 if a negative decision is obtained in step S6.

The KEYBOARD-MODE codes indicate the effective mode of the keyboard 3 selected for the entered characters or the character that will be entered. Described more specifically referring to FIG. 5D, the code "SD" is displayed at the beginning of a line of characters to be entered. If the KEYBOARD-MODE selector switch 20 is moved from the STANDARD mode position (SD) to the INTERNATIONAL mode position (IN) after the entry of words "The important", the KEYBOARD-MODE codes "SD" and "IN" and a STOP code "ST" are generated, stored in the line buffer 91 and the text memory 92, and displayed on the LCD display 71, such that the code "SD" follows the last entered character "t", and the code "ST" is positioned between the newly generated codes "SD" and "IN". Namely, the STANDARD mode (SD) is effective to the character data between the two KEYBOARD-MODE codes "SD", and the INTERNATIONAL mode (IN) is effective to character data to be entered following the code "IN".

The STOP code "ST" between the KEYBOARD-MODE codes "SD" and "IN" in the example of FIG. 5D is automatically generated to command a temporary stop of a printing operation of the entered data, in order to allow the operator to change the typewheel 37 from one kind corresponding to the STANDARD mode to another kind corresponding to the newly selected INTERNATIONAL mode. This STOP code "ST" can be used to stop a printing operation from the text data from the TEXT memory 92, in order to insert desired data entered through the keyboard 3 while the printing operation is interrupted at a desired position.

If a negative decision is obtained in step S6, the CPU 76 goes to step S7 to determine whether the message "Check keyboard mode" is displayed on the LCD display 71 or not. This determination is implemented according to the data stored in the KEYBOARD-MESSAGE flag 95. If an affirmative decision is obtained in step S7 as illustrated in FIG. 5D, step S7 is followed by step S8 wherein the message is removed. Then, the CPU 76 goes to step S9 to reset the KEYBOARD-MESSAGE flag 95, and returns to step S2.

If a negative decision is obtained in step S7, the CPU 76 goes to step S10 (FIG. 4B) to determine whether the cursor is positioned at the STOP code "ST". This determination is effected according to the data in the CURSOR POSITION pointer 94, and the data in the line buffer 91. If a negative decision is obtained in step S10 (as in the examples of FIGS. 5A, 5B, 5C and 5D), the CPU 76 goes to step S11.

In step S11, the CPU 76 determines whether a message "Print stop position" is displayed on the LCD display 71 or not. If this message is displayed (in the example of FIG. 5E), step S11 is followed by step S12 to remove the message from the display 71. Then, the CPU 76 goes to step S13 to reset the STOP-MESSAGE flag 96, and returns to step S2.

When characters are successively entered through the keyboard 3, step S2 through S13 are repeatedly executed, whereby the corresponding character data is stored in the line buffer 91 and the text memory 92.

When one of the CURSOR keys 17 is operated during entry of a word, step S4 is followed by step S14, and step S15 is executed to move the cursor 71a on the display 71 in the direction corresponding to the CURSOR key 17. Then, the CPU 76 executes steps S6–S13 and returns to step S2.

The SPELL key 18 is used to confirm the spelling of a word in the process of being entered, or an already entered word, or to find a candidate word or words for such a partially or entirely entered word. This key 18 is operated during entry of a word, or after the cursor 71a on the display 71 is moved to a desired character position of an entered word or an already entered portion of a word. In this instance, the CPU 76 goes to step S16 (FIG. 4C), through steps S4 and S14.

In step S16, the CPU 76 scans the dictionary memory 82 to search for a candidate word or words each of which includes successive characters similar to the displayed successive characters which precede the cursor on the display 71. This search is implemented according to the data in the CURSOR POSITION pointer 94 and the data in the line buffer 91 by comparing the data in the line buffer 91 with the word data in the dictionary memory 82. The searched candidate word or words are stored in the CANDIDATE WORD memory 97, and applied to the display device D through the interface 75. Thus, the candidate word or words are displayed on the display 71, as illustrated in FIGS. 5A and 5C, according to the appropriate control program stored in the program memory 81. If the SPELL key 18 is operated while a candidate word or words are displayed as a result of the preceding operation of the same key 18, the already displayed candidate word or words are removed, and a candidate word or words are displayed for the current operation of the key 18.

If the NEXT CANDIDATE key 21 is operated while a candidate word or words are displayed, the CPU 76 executes step S15 to replace the currently displayed candidate word or words with other candidate words if any, within a predetermined display capacity of the display 71 assigned to display the candidate words.

If a data input operation is interrupted during entry of a word as indicated in FIG. 5A, or after an editing of the entered character or characters is performed with the cursor moved back to the appropriate position by the CURSOR key 17, step S2 is followed by step S17 (FIG. 4C) in which the CPU 76 determines whether the data which has been entered last is character data, namely, whether the instant data input interruption occurs during entry of a word. In the present case, the last entered data is character data representative of a character of a word, an affirmative decision is obtained in step S17, and the flow goes to step S18. In step S18, the CPU 76 determines whether the timer 100 has already been started or not. This determination is made based on the count of the timer 100. If the timer 100 has been started (if the count of the timer 100 is not zero), the flow goes to step S20. If a negative decision is obtained in step S18, step S19 is executed to start the timer 100. Then, the CPU 76 goes to step S20.

In step S20, the CPU 76 determines whether the timer 100 has measured a predetermined time duration of five (5) seconds, or not. If not, steps S2 and S17–S20 are repeated. If the predetermined time duration of 5 seconds has elapsed, step S20 is followed by step S21 to clear or reset the timer 100. Then, the flow goes to step S16 to display a candidate word or words which relate to the successive characters which precede the cursor position. For example, the candidate word includes the successive characters preceding the cursor position, as indicated in FIGS. 5A and 5C. Then, step S16 is followed by step S2.

On the other hand, if a data input operation is interrupted while the cursor is positioned at one of characters of a displayed word by the CURSOR key(s) 17, as indicated in FIG. 5C, a negative decision is obtained in step S17, and the flow goes to step S22 to determine whether the cursor is positioned at a character of a word. This determination is implemented based on the data in the CURSOR POSITION counter 93, and the data in the CURSOR POSITION pointer 94 and the line buffer 91, i.e., the data corresponding to the current position of the cursor. Since the cursor is positioned at one of the characters of a word, an affirmative decision is obtained in step S22, and step S23 is performed. Steps 23 through 27 are similar to steps S18–S21 and S16 described above. Namely, a candidate word or words for the displayed word in question are displayed on the LCD display 71, when the timer 100 has measured the predetermined time of 5 seconds.

However, step S27 is different from step S16, in that each candidate word displayed in step S27 relates to all the characters of the displayed word (within which the cursor is positioned), contrary to a candidate word of step S16 which relates to only the successive characters of the word in question which precede the cursor position. Step S27 is further different from step S16, in that the buzzer 102 is activated in step S27 if the dictionary memory 82 does not store the displayed word in question.

In the case where an interruption of a data input operation occurs while the cursor 71a is positioned at one of the KEYBOARD-MODE code "SD", "IN" and "SY", as indicated in FIG. 5D, step S22 is followed by step S28 (FIG. 4D), and an affirmative decision is obtained in step S28. Namely, in step S28, the CPU 76 determines whether the cursor 71a is positioned at the code "SD", "IN" or "SY". As a result, step S28 is followed by step S29.

Steps S29-S32 are identical with steps S17-S21 described above. When the timer 100 has measured 5 seconds, step S33 is executed after the timer 100 is cleared in step S32. In step S33, the previously indicated message "Check keyboard mode" is displayed. Step S33 is followed by step S34 to set the KEYBOARD-MESSAGE flag 95. The flow then goes back to step S2.

If an interruption of a data input operation takes place while the cursor 71a is positioned at the STOP code "ST", as indicated in FIG. 5E, the CPU 76 determines in step S35 that the cursor 71a is positioned at the STOP code. This determination is effected based on the data in the CURSOR POSITION pointer 94 and the data in the line buffer 91. Consequently, step S35 is followed by step S36. Steps S36-S39 are identical with steps S17-S21. When the predetermined time of 5 seconds has elapsed, the flow goes to step S40 to display the previously indicated message "Print stop position", and to step S41 to set the STOP-MESSAGE flag 96. The flow then returns to step S2.

In the case where a data input interruption occurs after word-separation data such as a space code, a comma code or a period code is entered following entered word data, as indicated in FIG. 5B, a negative decision is obtained in step S35, and steps S2, S17, S22, S28 and S35 are merely repeatedly executed. In this instance, the display 71 does not provide candidate words, or the messages described above.

It will be understood from the foregoing description, that a candidate word or words to be substituted for displayed successive characters or a displayed word are automatically displayed if a data input operation is interrupted for a predetermined time duration, as well as upon operation of the SPELL key 18. Therefore, the present typewriter 1 has improved ease of operation.

While the above operational description refers to an automatic display of candidate words if a data input interruption continues for a predetermined time during entry of a word in the memory mode, the display of the candidate words is also provided while the typewriter 1 is operated in the typewriter mode, namely, while characters are printed as they are entered through the keyboard 3. Described in greater detail, if a data input operation and a resulting printing operation are interrupted for a predetermined time, the LCD display 71 provides a candidate word or words which relate to already printed successive characters of a word in the process of being printed. Hence, if the operator is not sure of the correct spelling of the already printed characters of a word, related candidate words are automatically displayed if the data input operation is interrupted for a certain period of time. Thus, the operator can confirm the spelling of the word in question, without operating any specific key, and without printing a misspelled word.

Figure 6:
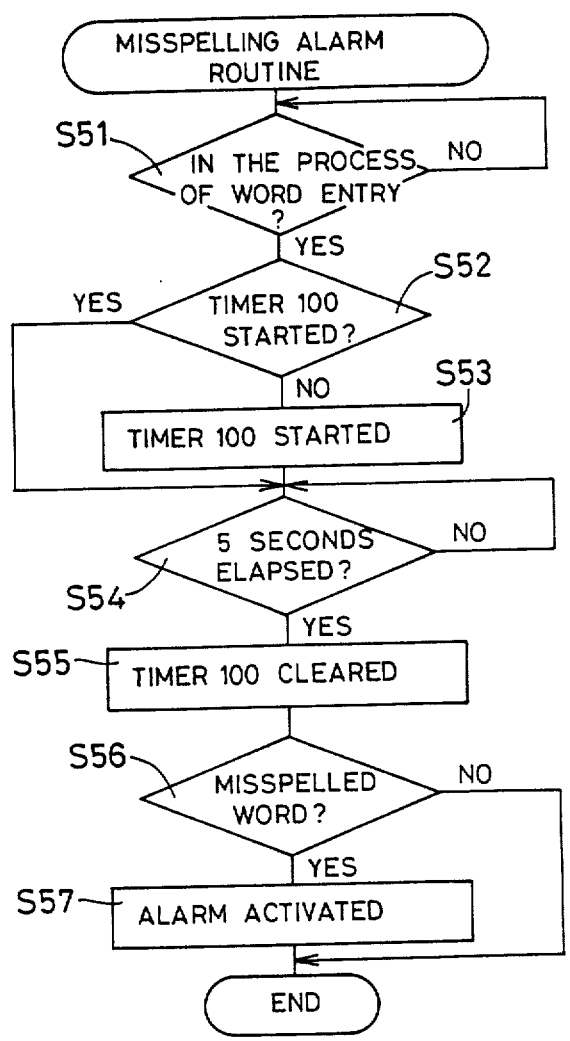
FIG. 6 is a flow chart showing a control routine for providing a misspelling alarm on a typewriter according to another embodiment of the invention.

While the typewriter 1 illustrated above is adapted to provide an automatic indication of a candidate word or words if a data input interruption continues for more than a predetermined time, the principle of the present invention may be otherwise embodied. For instance, if the typewriter has a spell-checking function but does not have a function of displaying candidate correct words for a detected misspelled word, it is possible to provide an alarm indicating the misspelling of a word if an operation to enter that word is interrupted for more than a predetermined time. A control routine for providing this alarm is illustrated in the flow chart of FIG. 6, which shows steps S51 through S57. Steps S51-S55 are identical with steps S17-S21 of FIG. 4C described above. In step S56, the CPU 76 determines whether the dictionary memory 82 stores a word which includes the already entered characters, or not by comparing the already entered characters with the word data stored in the dictionary memory 82. If not, step S57 is executed to activate a buzzer as indicated at 102 in FIG. 3C, a light emitting diode or other optical element, an audio element generating an audible voice message, or any other suitable alarming device.

Although the above embodiments of the invention take the form of an electronic typewriter, the concept of the invention may be applied to other types of data processing apparatus as described below.

For instance, the invention may be embodied as a word processor or text processing instrument as illustrated in FIG. 7. This word processor includes an input device 103, a printing mechanism 104, a CRT display 106, a memory device 108, and a control device 110 for controlling the members 103, 104, 106 and 108. If an interruption of a data input operation through the input device 103 continues for more than a predetermined time after a proper name such as a name of a person or company, information associated with that proper name, for example, address or telephone number of the person or company is automatically displayed on the CRT display 106. A control routine for displaying such related information is illustrated in the flow chart of FIG. 8. Briefly, if a predetermined time of 5 seconds has passed after completion of entry of a proper name in step S61, an affirmative decision is obtained in step S64, and the related information such as the address relating to the entered name is displayed on the display 106. Steps S62-S65 are similar to steps S18-S21 of FIG. 4C.

Further, the invention may be embodied as a computer, such that information associated with input command or data is displayed if an operation to enter such command or data is interrupted for more than a predetermined time.

For example, the invention may be embodied as a cash delivery system as shown in FIG. 9, which includes an input device 112, a cash delivery device 114, a card reader 116, a LCD display 118, an audio message device 120, and a control device 122 for controlling the members 112, 114, 116, 118 and 120. An operation of this cash delivery system is illustrated in the flow chart of FIG. 10.

Initially, the control device 122 determines in step S71 whether a DELIVERY button on the input device 112 is operated, or not. This step S71 is repeated until the button is operated. When the button is operated, steps S72, S73 and S74 are executed. If a preset time has elapsed after the operation of the button, an affirmative decision is obtained in step S74, and the flow goes to step S75 in which the LCD display 118 provides a message prompting the operator to insert a cash card into the card reader 116. At the same time, the audio message device 120 is activated to provide an audible message through its speaker, for prompting the operator to insert the cash card. Then, the control device 122 determines in step S76 whether the cash card has been inserted, or not. Steps S74, S75 and S76 are repeatedly executed until an affirmative decision is obtained in step S76. If the operator has inserted the cash card before the predetermined time has passed, a negative decision is obtained in step S74, and step S75 is skipped.

Then, the flow goes to operational box S77 in which a series of steps similar to steps S72-S76 are executed, to prompt the operator to enter a key code of the inserted cash card, if a predetermined time has elapsed after the insertion of the cash card. If the key code is entered within the predetermined time, the flow goes to operational box S78, without the display 118 and audio message device 120 being activated to provide the visual and audio prompting messages. In the operational box S78, a series of steps similar to steps S72-S76 are executed, to prompt the operator to designate a desired amount of cash to be drawn, if the predetermined time has elapsed after the entry of the key code. If the desired amount is designated within the predetermined time, box S78 is followed by step S79 in which the designated amount of cash is delivered from the cash delivery device 114, and the cash card is returned from the card reader 116.

Figure 8:
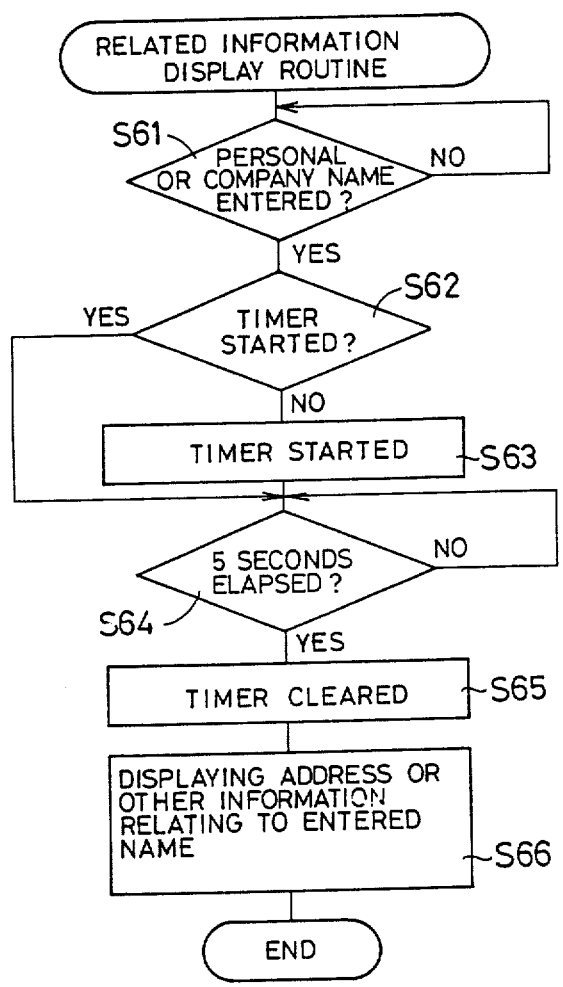
FIG. 8 is a flow chart showing a control routine for displaying information associated with entered data on the word processor of FIG. 7.
Figure 10:
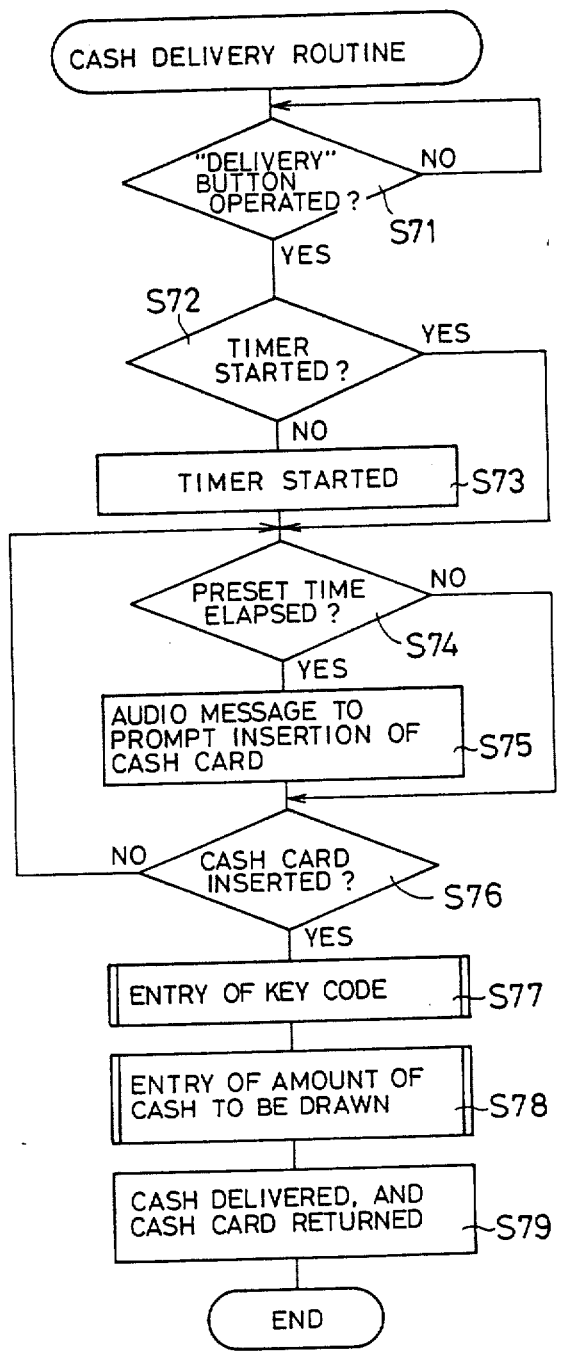
FIG. 10 is a flow chart showing a control routine of the apparatus of FIG. 9.

It will be understood from the foregoing description that the control device C, display device D, buzzer drive 101 and buzzer 102 of the embodiment of FIGS. 1-5, the control device 110 and CRT display 106 of the embodiment of FIGS. 7 and 8, and the LCD display 118, audio message device 120 and control device 122 of the embodiment of FIGS. 9 and 10 serve as informing means for providing related information associated with the interrupted data entry operation, such as candidate words, operator prompt messages concerning the keyboard mode and the print stop command, an alarming sound, and address and telephone numbers of entered proper names.

While the present invention has been described in its presently preferred embodiments with a certain degree of particularity, it is to be understood that the invention is not limited to the precise details of the illustrated embodiments, and that the invention may be embodied with various changes, modifications and improvements which may occur to those skilled in the art, without departing from the spirit and scope of the invention defined in the appended claims.

What is claimed is:

1. A data processing apparatus comprising:
   a dictionary memory storing word data representative of a multiplicity of words;
   input means including an input device which is capable of entering document data including word data representative of a plurality of words each consisting of at least one character and word separation data indicative of termination of entry of each of said plurality of words;
   time-measuring means connected to said input means, for measuring a predetermined time duration during which a data entry operation through said input means is interrupted, said time-measuring means measuring said predetermined time duration while said data entry operation through said input means is possible; and
   informing means responsive to said time-measuring means, for providing related word or character information associated with said data entry operation interrupted and helpful in resuming the interrupted data entry operation, without an operation through said input means by an operator, when said time-measuring means has measured said predetermined time duration.

2. A data processing apparatus according to claim 1, wherein
   said time-measuring means consists of means for measuring an interruption time during which the operation to enter said each word is interrupted before said word-separation data is entered,
   said informing means including searching means for scanning said dictionary memory to search for at least one candidate word which includes as many characters as possible which have been entered before interruption of said operation to enter said each word, said searching means searching said at least one candidate word by comparing the entered characters with the word data in said dictionary memory, said informing means including a display for displaying said at least one candidate word as said related word or character information, and a control device for controlling said display.

3. A data processing apparatus according to claim 2, wherein said time-measuring means determines whether data which has been entered last consists of character data representative of a character, said time-measuring means starting to measure said interruption time upon determination that said data which has been entered last consists of character data.

4. A data processing apparatus according to claim 1, wherein said informing means comprises a display for displaying the data entered through said input means, said display having a cursor, and said input means having means for moving said cursor, and wherein
   said time-measuring means measures said predetermined time duration while said cursor is positioned at one of characters of a word displayed on the display to designate said word,
   said informing means including search means for scanning said dictionary memory to search for at least one related word which relates to said word designated by said cursor, said searching means searching said at least one related word by comparing said characters of said word displayed on said display with the word data in said dictionary memory, said display displaying said at least one related word as said related word or character information.

5. A data processing apparatus according to claim 4, wherein said at least one related word consists of at least one candidate word to be substituted for said word designated by said cursor.

6. A data processing apparatus according to claim 1, wherein said input means includes operator-controlled means for activating said informing means before said time-measuring means has measured said predetermined time duration.

7. A data processing apparatus according to claim 1, wherein said input device includes a keyboard which has a plurality of keys and which is operable selectively in a plurality of modes in which at least one of said keys generates different data signals, said keyboard including an operator-controlled selector for selecting one of said plurality of modes, said informing means being activated to further provide a message to prompt the operator to confirm the adequacy of the mode selected by said selector, if said time-measuring means has measured a predetermined time after said selector is operated.

8. A data processing apparatus according to claim 1, wherein said informing means comprises a display having a cursor movable thereon, and said input device comprises a keyboard which has a plurality of keys and which is operable selectively in a plurality of modes in which said character keys generate different signals, said keyboard including an operator-controlled selector for selecting one of said plurality of modes, and cursor-positioning means for moving said cursor on said display, said display displaying a character indicative of an operation of said selector, said informing means being activated to further provide a message to prompt the operator to confirm the adequacy of the mode selected by said selector, if said time-measuring means has measured a predetermined time after said cursor is positioned at said character indicative of the operation of said selector.

9. A data processing apparatus according to claim 1, further comprising a printing device for printing data entered through said input means, and stop command means for providing a stop command to stop said printing device, said informing means being activated to further provide a message informing the operator of the stopping of a printing operation of said printing device, if said timemeasuring means has measured a predetermined time after said stop command is provided.

10. A data processing apparatus according to claim 1, further comprising a printing device and stop command means for providing a stop command to stop said printing device, and wherein said informing means comprises a display having a cursor movable thereon, and said input means comprises cursor-positioning means for moving said cursor on said display, said display displaying a character indicative of said stop command, said informing means being activated to further provide a message informing the operator of the stopping of a printing operation of said printing device, if said time-measuring means has measured a predetermined time after said cursor is positioned at said character indicative of said stop command.

11. A data processing apparatus according to claim 1, wherein
said input means includes a keyboard as said input device,
said time-measuring means comprises means for measuring an interruption time during which the operation to enter said each word is interrupted before said wordseparation data is entered,
said informing means including searching means for scanning said dictionary memory to determined whether said dictionary memory stores a word which includes successive characters which have been entered before interruption of said operation to enter said each word, said informing means including an alarm device which is activated upon determination that said dictionary memory does not store said word which includes said successive characters, said alarm device providing an audible alarm informing the operator that said successive characters are misspelled.

12. A data processing apparatus according to claim 1, wherein said informing means comprises a display for displaying said related word or character information, and a control device for controlling said display.

13. A data processing apparatus according to claim 15, wherein said informing means comprises an audio message device for providing audible information indicative of said operation that should be performed next, and a control device for controlling said audio message device.

14. A data processing apparatus according to claim 1, wherein said dictionary memory stores proper names such as names of persons and companies as said word data, and said informing means comprises an output device for providing as said related character information information such as addresses and telephone numbers which correspond to said proper names.

15. A data processing apparatus according to claim 1, wherein said informing means comprises an output device for further providing information indicating the operator of an operation that should be performed next, when said time measuring means has measured a predetermined time after a command to perform a specific function is entered.

16. A data processing apparatus comprising:
an input device for entering document data including word data representative of a plurality of words each consisting of at least one character, and word-separation data indicative of termination of entry of each of said plurality of words;
time-measuring means connected to said input device, for measuring a predetermined interruption time during which an operation to enter said each word through said input device is interrupted before said word-separation data is entered;
a dictionary memory storing word data representative of a multiplicity of words;
searching means activated when said time-measuring means has measured said predetermined interruption time, for scanning said dictionary memory to search for at least one candidate word which includes characters which have been entered before interruption of said operation to enter said each word, said searching means scanning said dictionary memory for said at least one candidate word by comparing the entered characters with the word data in said dictionary memory;
a display for displaying said at least one candidate word; and
a control device for controlling said display such that said at least one candidate word searched for by said searching means is displayed on said display.

17. A data processing apparatus comprising:
an input device for entering document data including word data representative of a plurality of words each consisting of at least one character, and word-separation data indicative of termination of entry of each of said plurality of words;
a display for displaying said document data entered through said input device, said display including a cursor, and said input device including means for moving said cursor on said display;

time-measuring means connected to said input device, for measuring a predetermined interruption time during which an operation to enter said document data through said input device is interrupted while said cursor is positioned at one of characters of a word displayed on the display to designate said word;

a dictionary memory storing word data representative of a multiplicity of words;

searching means activated when said time-measuring means has measured said predetermined interruption time, for scanning said dictionary memory to search for at least one related word which relates to said word designated by said cursor, said searching means scanning said dictionary memory for said at least one related word by comparing said characters of said word designated by said cursor device for controlling said display such that said at least one candidate word searched for by said searching means is displayed on said display.

18. A data processing apparatus according to claim 17, wherein said searching means searches for at least one candidate word as said at least one related word, each of said at least one candidate word including characters of said word designated by said cursor.

* * * * *